United States Patent [19]
Gaudard

[11] 3,938,339
[45] Feb. 17, 1976

[54] MEANS FOR SHOWING AND/OR DETOURING WATER CURRENTS AND THE PREPARATION THEREOF

[75] Inventor: Yves Gaudard, Lyon, France

[73] Assignee: Rhone-Poulenc-Textile, Paris, France

[22] Filed: July 29, 1974

[21] Appl. No.: 492,825

[30] Foreign Application Priority Data
Aug. 3, 1973  France .............................. 73.28757

[52] U.S. Cl. ............................................. 61/4; 61/30
[51] Int. Cl.² ...................... E02B 3/02; E02B 3/06
[58] Field of Search .............. 61/2, 3, 4, 37, 38, 50, 61/1 R, 5, 35, 30

[56] References Cited
UNITED STATES PATENTS
| | | | |
|---|---|---|---|
| 1,489,424 | 4/1924 | Canfield | 61/4 |
| 2,757,514 | 8/1956 | Wyatt | 61/1 R |
| 3,383,863 | 5/1968 | Berry | 61/1 R |
| 3,383,864 | 5/1968 | Turzillo | 61/3 |
| 3,670,506 | 6/1972 | Gaudard | 61/35 |
| 3,720,067 | 3/1973 | Aubert | 61/50 |

FOREIGN PATENTS OR APPLICATIONS
| | | | |
|---|---|---|---|
| 1,249,971 | 11/1960 | France | 61/4 |
| 88,825 | 3/1967 | France | 61/3 |
| 2,017,538 | 5/1970 | France | 61/1 R |
| 49,194 | 4/1921 | Sweden | 61/30 |

*Primary Examiner*—Paul R. Gilliam
*Assistant Examiner*—Alex Grosz
*Attorney, Agent, or Firm*—Sherman & Shalloway

[57] ABSTRACT

A jetty arranged angularly to the edges of a body of water so as to slow down or detour the currents having a pile of fill with its base resting on an excavation and an unwoven fabric surrounding the pile with wave breaking means surmounting the pile.

8 Claims, 2 Drawing Figures

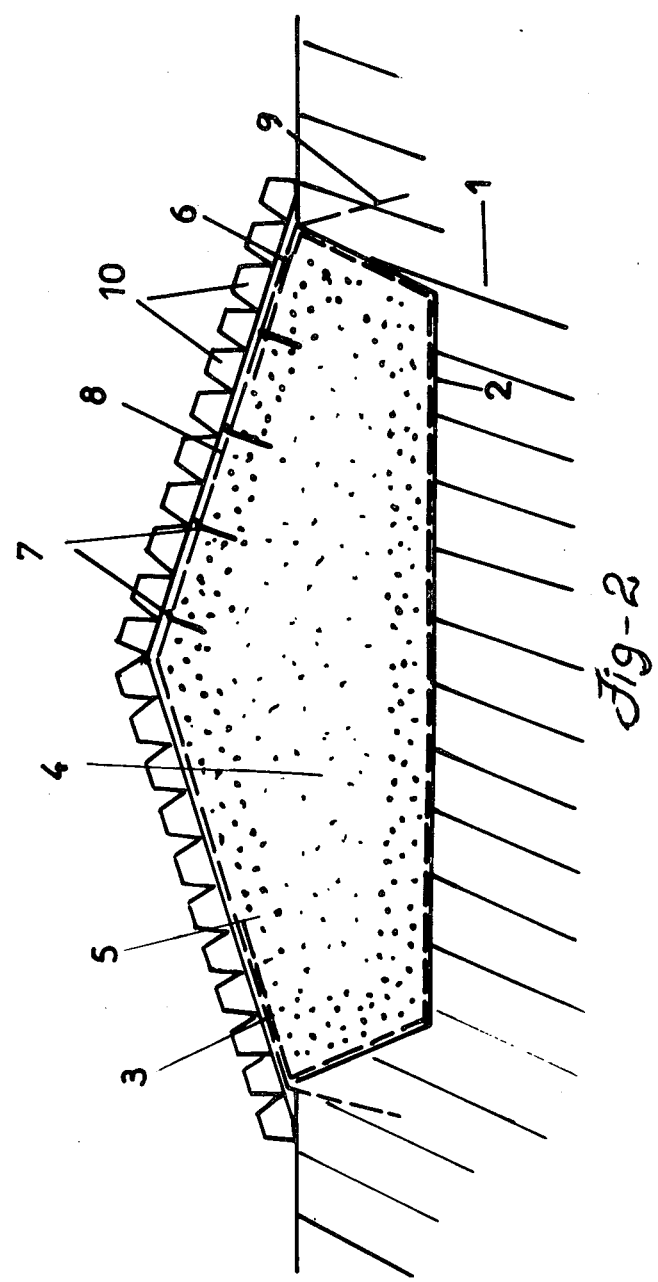

MEANS FOR SHOWING AND/OR DETOURING WATER CURRENTS AND THE PREPARATION THEREOF

BACKGROUND OF THE INVENTION

The invention relates to a means for slowing down and/or detouring water currents. More particularly, this invention relates to a jetty that is built in an angular manner in relation to the edges of a sea, lake, bank or estuary of a river, and to its method of preparation.

More often, this type of means is constructed perpendicularly in relation to the banks. It is commonly designated by the name jetty and comprises piles of stones, possibly held by metallic grills or by coatings of asphalt or other materials. The jetties thus obtained are satisfactory in regard to stability but pose a shipping problem which considerably increases their cost. It was then proposed to replace the stones by sand bags which are easier to handle, however, the sand bags are less resistant to erosion and are relatively costly.

SUMMARY OF THE INVENTION

There is now proposed a novel very stable jetty which is obtained by use of relatively inexpensive materials which are more easy to handle.

The invention relates to means arranged angularly in relation to the edge of a body of water so as to slow down and/or detour the currents, comprising a pile of fill whose base rests in an excavation surrounded by an unwoven fabric whose surface is located outside the excavation and surmounted by wave breaking elements.

The invention also relates to the process of producing sand means by:

a. digging out an excavation at the site of the work,
b. laying an unwoven fabric in the excavation and permitting it to go outside the excavation,
c. piling a fill in and above the excavation,
d. laying the edges of the unwoven fabric over the fill, and
e. laying wave breaking elements on the surface of the unwoven fabric located outside the excavation.

According to the present invention, the unwoven fabric preferably meets the following conditions:

1. It preferably should have a sufficient mechanical resistance to bear the action of water currents.
2. It preferably should be rot-proof even after a long stay in the water.
3. It should preferably be porous so as to permit drainage of the water that goes through the wave breaking elements toward the edges of the jetty. Particularly preferred results are obtained with a spunbonded type unwoven fabric.

By spunbonded type unwoven fabric is meant an unwoven layer made up of continuous filaments which are generally arranged at random throughout the layer. One known means of fabricating these layers consists in extruding a polymer, orienting the filaments of the polymer obtained by drawing, receiving the filaments on a mobile conveyer belt in the form of a layer and binding them to one another, at least on the surface, by calibrating or calendering the layer. The filaments of the unwoven layer are preferably of synthetic materials such as polyesters, particularly ethylene polyterephthalate, or polyamides such as polyhexamethylene adipamide, polycaproamide and the like, although other organic fibers such as polyvinyl chloride, polyvinylidene and its derivatives, cellulose acetate, polyacrylonitrile, polyolefins, etc. may be used.

The unwoven layers most preferred in the practice of this invention are those weight ranges between 300 and 1200 grams per square meter and preferably between 600 and 700 grams per square meter. If desired, these layers can contain a charge, adjuvant or reinforcement i.e., layers of parallel filaments or fibers, grill fabrics and the like.

The fill making up the body of the jetty is generally a material found on site such as sand, gravel or the like. Cohesion of this material can advantageously be assured by a chemical binder which can be, for example, cement, bitumen, lime or polymerizable resins. The chemical binder is introduced into the fill so as to form a regular, reinforced layer, surrounding the body of the jetty above the excavation. Introduction can be performed by any usually used technique for this type of operation, for example, by injection or spraying.

According to the present invention, the wave breaking elements at the top of the jetty are made up of traditional materials such as stone or shaped objects of cement or concrete. In general, their load is at least 100 kg per square meter. When shaped objects are used, they are preferably in the form of paving stones that are regularly aligned and cemented together on a grill of plastic or on a synthetic fabric. The role of these objects is to simultaneously protect the jetty and to absorb the shocks created by the waves.

The embodiments of the process according to the present invention will be better understood with reference to the accompanying drawings wherein:

BRIEF DESCRIPTION OF THE DRAWINGS

FIG. 2 is a sectional view of a jetty in accordance with this invention with wave breakers.

DESCRIPTION OF THE PREFERRED EMBODIMENT

Figure 1:
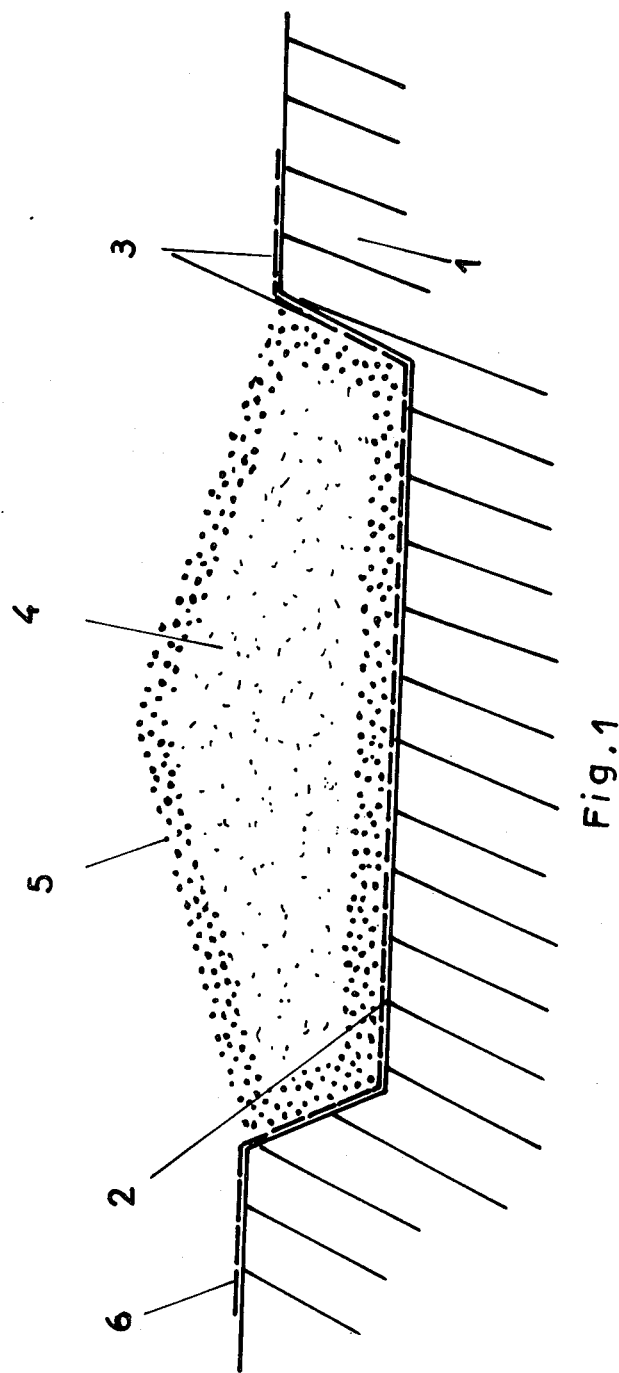
FIG. 1 is a sectional view of the jetty of the present invention before placement of wave breakers.

With reference to FIG. 1 there is shown in the bottom of a water 1 an excavation 2 that is dug for placement of a jetty, generally in the form of a pan flaring upward so that stability is improved. The depth of the excavation is determined beforehand by considering the height of the ground, the force of the currents and the materials used. An unwoven fabric 3 is unrolled in form of strips which have been previously assembled by sewing, gluing, fusing or the like, on the bottom and edges of the excavation 2. A fill 4 is placed in and above the excavation 2 to a desired height while simultaneously introducing a binder 5 on the edges then on the top of the pile. As shown in FIG. 2, the edges 6 of the unwoven fabric are bent back over the fill and, if desired, kept in place with concrete iron pins 7 or similar means. In some cases, it may be preferred to unroll an additional strip of unwoven fabric 8 whose edges, on each side of the jetty, are buried in the ground and constitute cut-offs. Wave breaking elements 10 are placed on the fabric at the top of the jetty. The jetty obtained according to the process of the present invention is simple and rapid to achieve. Its cost is low because most of the materials are found on site. Finally, since the stability is good, it can be built in areas of violent currents.

The following non-limiting example illustrates the invention:

EXAMPLE

At the edge of an ocean, to protect the shore from sea currents, a jetty as shown in FIG. 2 is built in the following manner:

On the sea floor an excavation is dug for 30 meters perpendicular to the shore. The excavation is two meters deep and has a width at the base of seven meters and at the floor level of nine meters. There is unrolled in the excavation a spunbonded unwoven fabric strip 4 meters wide, weighing 600 grams per square meter, assembled by sewing and made up of ethylene polyterephthalate filaments of 10 dtex (9 den), elongation at rupture 130 percent and tensile strength 28.8 RKm. The edges of the fabric are allowed to go over 12 meters on each side of the excavation. Sand that is recovered on site with a density ranging from 1.6 to 1.8 is piled in the excavation. The part of the pile located above the ground is given a triangular shape whose upper height, which is 1.5 meters toward the side, increases progressively in going toward the sea so that it always remains above sea level, even at the highest tide. As the pile is built up, a porous reinforcing bitumen is injected in the sand so as to form a layer two meters deep surrounding the pile. The edges of the fabric are laid back on the pile to wrap and surround the pile and kept in place by concrete iron spikes placed every 2 meters. On the triangular part of the work is placed a layer of cemented shaped concrete paving stones on a synthetic fabric having a load of about 150 kg per square meter. It has been found that, at the level of the jetty, the tide is rarely felt on the beach even with a maximum swell.

Although the present invention has been described with reference to a particular embodiment, it will be apparent to those skilled in the art that variations and modifications of this invention can be made without departing from the principles and spirit of the invention.

What is claimed is:

1. A jetty arranged angularly in relation to the edge of a body of water, to slow down and/or detour currents, comprising
   a. a non-woven porous web of randomly arranged continuous filaments lining an excavation and having edges extended beyond the excavation,
   b. a pile of fill in said excavation and extending upwardly therefrom to form a surface outside of the excavation,
   c. said extended edges of said non-woven web being wrapped back against the outside surface of the pile to surround said pile of fill, and
   d. a layer of wave-breaking elements superimposed on said wrapped edges of the non-woven web.

2. The jetty according to claim 1, wherein the edges and top of said pile are reinforced with a chemical binder.

3. The jetty according to claim 1, wherein said layer of continuous filaments weighs between 300 and 1200 g/square meter.

4. The jetty according to claim 3, wherein said filaments of the layer are synthetic polymer.

5. the jetty according to claim 4, wherein said synthetic polymer is ethylene polyterephthalate.

6. A process of preparing a jetty which comprises the steps of:
   a. digging an excavation,
   b. laying an unwoven porous fabric of randomly arranged continuous filaments in said excavation with a portion projecting out of the excavation,
   c. piling a fill in and above said excavation,
   d. laying the edges of the unwoven fabric back over said fill to wrap said fill, and
   e. placing on the surface of said unwoven fabric located outside the excavation wave breaking means.

7. The process according to claim 6, wherein the edges and the top of the pile are reinforced with a chemical binder during construction.

8. The process according to claim 6, wherein an additional strip of unwoven fabric is unrolled on the pile, said additional fabric having its edges on each side of the jetty buried adjacent said excavation.

* * * * *